(12) United States Patent
Hiramatsu

(10) Patent No.: US 6,983,165 B1
(45) Date of Patent: Jan. 3, 2006

(54) RADIO COMMUNICATION APPARATUS AND TRANSMISSION POWER CONTROL METHOD

(75) Inventor: Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 647 days.

(21) Appl. No.: 09/857,030

(22) PCT Filed: Oct. 6, 2000

(86) PCT No.: PCT/JP00/06973

§ 371 (c)(1),
(2), (4) Date: May 31, 2001

(87) PCT Pub. No.: WO01/26406

PCT Pub. Date: Apr. 12, 2001

(30) Foreign Application Priority Data

Oct. 7, 1999  (JP) .................................. 11/286317

(51) Int. Cl.
H04Q 7/20 (2006.01)
(52) U.S. Cl. ...................... 455/522; 455/69; 455/63.1; 370/328; 370/342; 370/318; 375/142
(58) Field of Classification Search ................ 455/522, 455/69, 63.1; 370/318, 342, 328; 375/142
See application file for complete search history.

(56) References Cited

U.S. PATENT DOCUMENTS

| | | | |
|---|---|---|---|
| 5,559,790 A * | 9/1996 | Yano et al. ................. | 370/342 |
| 6,307,844 B1 | 10/2001 | Tsunehara et al. | |
| 6,404,757 B1 | 6/2002 | Ohshima | |
| 6,405,021 B1 * | 6/2002 | Hamabe ...................... | 455/69 |
| 6,647,003 B1 * | 11/2003 | Abeta et al. ................ | 370/335 |
| 6,667,965 B1 * | 12/2003 | Yamaura et al. ............ | 370/347 |
| 2002/0094836 A1 * | 7/2002 | Nakamura et al. .......... | 455/522 |

FOREIGN PATENT DOCUMENTS

| | | |
|---|---|---|
| EP | 0853393 | 7/1998 |
| EP | 0917303 | 5/1999 |

(Continued)

OTHER PUBLICATIONS

PCT International Search Report dated Jan. 16, 2001.

*Primary Examiner*—Nick Corsaro
*Assistant Examiner*—Allan T. Gantt
(74) *Attorney, Agent, or Firm*—Stevens, Davis, Miller & Mosher, LLP

(57) ABSTRACT

Desired signal power measured at a desired signal power measuring circuit 105 is averaged over a plurality of slots by an averaging circuit 106 to reduce a power error in desired signal power of each slot. An SIR measuring circuit 108 calculates SIR(n) of each slot from the average value of desired signal power in the plurality of slots and the measured value of interference signal power of each slot, and a TPC generating circuit 109 makes a comparison between SIR(n) of each slot and a threshold value, and generates transmission power control information. This makes it possible to control transmission power for each slot with high accuracy in asymmetrical communication.

10 Claims, 4 Drawing Sheets

| | FOREIGN PATENT DOCUMENTS | | | | |
|----|----|----|----|----|----|
| EP | 0942541 | 9/1999 | JP | 10209959 | 8/1998 |
| EP | 0948221 | 10/1999 | JP | 10242905 | 9/1998 |
| JP | 832514 | 2/1996 | JP | 11122212 | 4/1999 |
| JP | 1013339 | 1/1998 | JP | 11186940 | 7/1999 |
| JP | 1098431 | 4/1998 | JP | 11196456 | 7/1999 |
| JP | 10145293 | 5/1998 | JP | 11266199 | 9/1999 |
| JP | 10173594 | 6/1998 | WO | 9634451 | 10/1996 |

\* cited by examiner

RADIO COMMUNICATION APPARATUS AND TRANSMISSION POWER CONTROL METHOD

TECHNICAL FIELD

The present invention relates to a radio communication apparatus and a transmission power control method, which are used in a radio transmitting system such as a mobile phone, a cellular phone and the like.

BACKGROUND ART

In a radio transmitting system such as a mobile phone, a cellular phone and the like, an SIR (Signal to Interference Ratio) is fixed and transmission power control is carried out in accordance with the state of each transmission channel in order to maintain a BER (Bit Error Rate) at a value below a predetermined value.

The transmission power control method includes a closed loop transmission power control and an open loop transmission power control.

The closed loop transmission power control is a method for controlling transmission power based on the contents of a TPC (Transmit Power Control) command where SIR corresponding to reception quality of a transmitting signal from one end is measured at the other end of communication and the TPC command, which reduces transmission power when a measured SIR value is higher than a target SIR value and which increases transmission power when the measured SIR value is lower than the target SIR value, is transmitted through an inverse channel.

On the other hand, the open loop transmission power control is a method for controlling a transmission power value in such a way that a reception level is subtracted from the known transmission level of the other end of communication to calculate a level lost in a radio section and a target reception level of the other end of communication is added to the lost level.

Here, data communication in which the information amount of a forward link is greatly larger than that of a reverse link is expected to be mainstream in the future, and the development of a radio communication system of asymmetrical communication where the information amount of the reverse link is asymmetrical with respect to that of the forward link is proceeding.

In the case of the radio communication system where the information amount of the reverse link is symmetrical with respect to that of the forward link, since a time difference between transmission timing and reception timing is small, transmission power can be controlled for each slot with high accuracy.

However, in the radio communication system that performs asymmetrical communication where a time difference between transmission timing and reception timing becomes large, a method for controlling transmission power for each slot with high accuracy has not been disclosed yet.

DISCLOSURE OF INVENTION

It is an object of the present invention to provide a radio communication apparatus and a transmission power control method capable of controlling transmission power for each slot with high accuracy in asymmetrical communication.

The above object can be attained by averaging desired signal power over a plurality of slots to reduce a power error in desired signal power in the respective slots and to improve precision of measurement.

BEST MODE FOR CARRYING OUT THE INVENTION

Embodiments of the present invention will be specifically explained with reference to the drawings accompanying herewith.

First Embodiment

Figure 1:
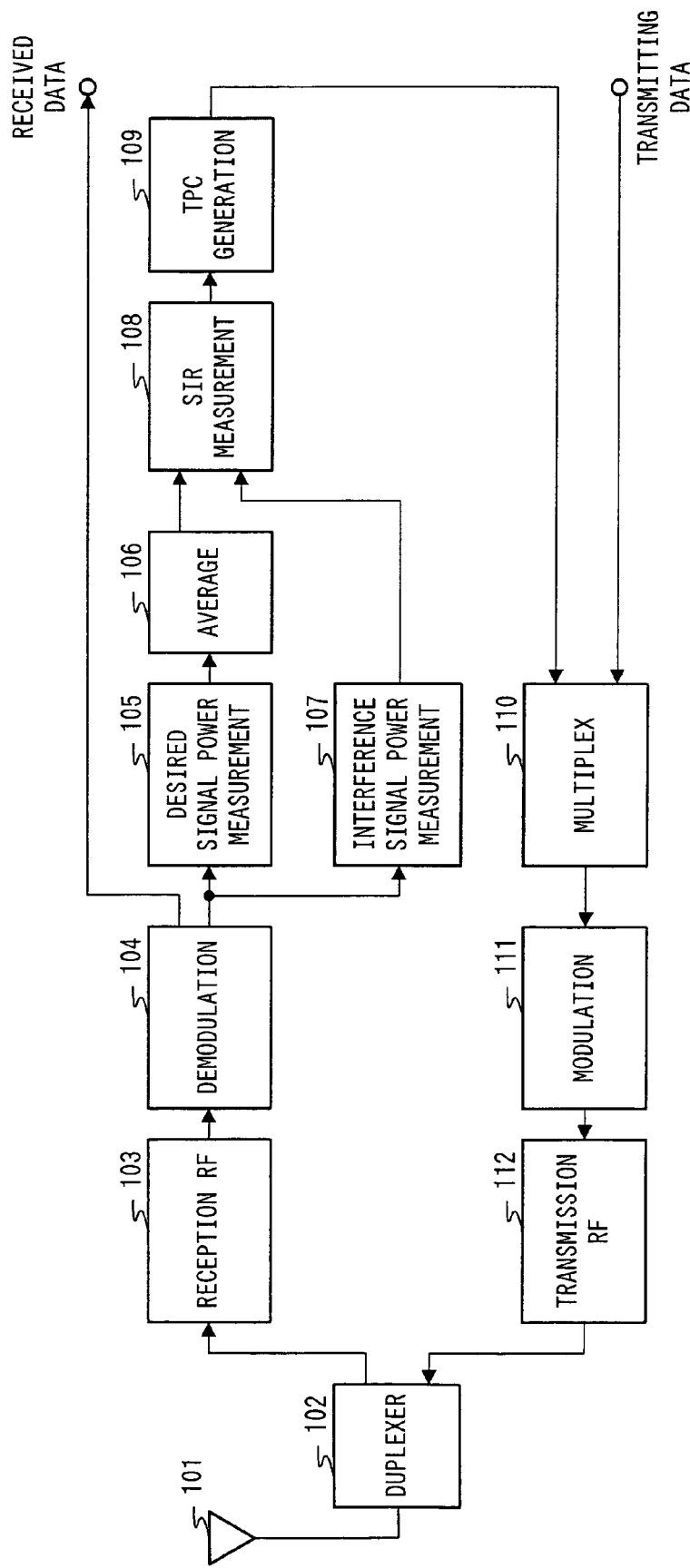
FIG. 1 is a block diagram illustrating the configuration of a radio communication apparatus according to a first embodiment of the present invention.

The first embodiment explains the case of the closed loop transmission power control. FIG. 1 is a block diagram illustrating the configuration of a radio communication apparatus according to the first embodiment of the present invention.

A duplexer 102 switches a channel through which a signal passes at a transmitting time and a receiving time and outputs a signal received from an antenna 101 to a reception RF circuit 103, and outputs a transmitting signal outputted from a transmission RF circuit 112 to the antenna 101.

The reception RF circuit 103 amplifies the received signal, frequency-converts the amplified signal to a baseband, and outputs the resultant to a demodulating circuit 104. The demodulating circuit 104 demodulates the baseband signal to extract received data of the radio communication apparatus.

A desired signal power measuring circuit 105 measures reception power (hereinafter referred to as "desired signal power") of a known signal included in the output signal of the demodulating circuit 104, and outputs a measuring result to an averaging circuit 106. The averaging circuit 106 calculates an average value of desired signal power in a plurality of slots, and outputs the average value to an SIR measuring circuit 108.

Here, in the case where a known signal sequence is long and an interference signal can be suppressed and the slots are close to each other and variations in reception power due to fading is small, desired signal power in the respective slots is substantially equal to each other. Accordingly, the calculation of the average value of desired signal power in the respective slots makes it possible to improve accuracy of measurement in desired signal power.

An interference signal power measuring circuit 107 measures power of an interference signal outputted from the demodulating circuit 104, and outputs a measuring result to the SIR measuring circuit 108.

The SIR measuring circuit 108 calculates SIR(n) (n indicates slot number) of each slot from the average value of desired signal power in the plurality of slots and the measured value of interference signal power of each slot, and outputs the resultant to a TPC generating circuit 109.

The TPC generating circuit 109 makes a comparison between SIR(n) of each slot and a threshold value, and generates transmission power control information, which instructs the slot whose SIR(n) is lower than the threshold value to increase transmission power, and generates transmission power control information, which instructs the slot whose SIR(n) is higher than the threshold value to reduce transmission power. After that, the TPC generating circuit 109 outputs generated transmission power control information of each slot to a multiplexing circuit 110.

The multiplexing circuit 110 multiplexes a plurality of pieces of transmission power control information into one slot transmitting data and outputs the resultant to a modulating circuit 111. The modulating circuit 111 modulates an output signal of the multiplexing circuit 110, and outputs the modulated signal to a transmission RF circuit 112. The transmission RF circuit 112 converts the frequency of an output signal of the modulating circuit 111, amplifies transmission power, and transmits the amplified transmission power as a radio signal from the antenna 102 through a duplexer 102.

Figure 2:
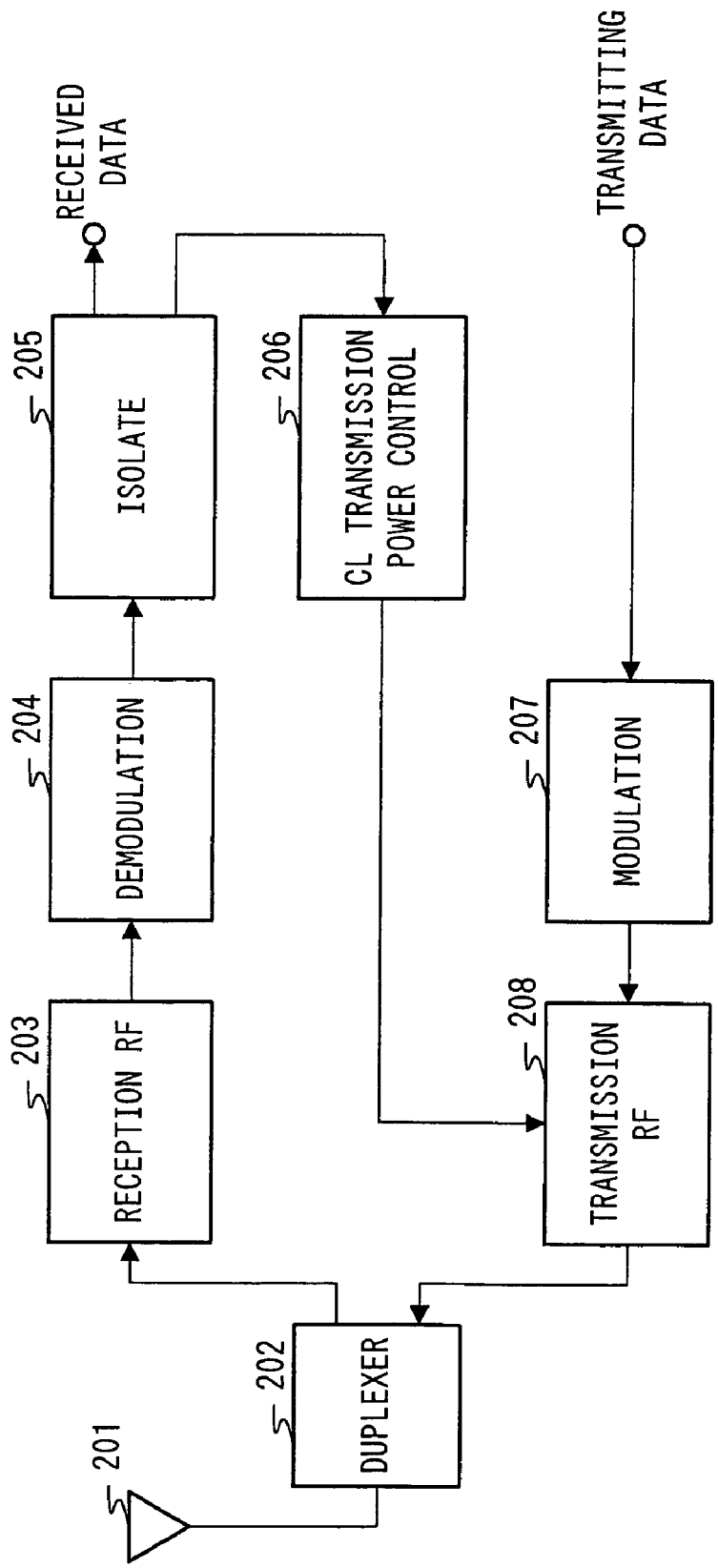
FIG. 2 is a block diagram illustrating the configuration of a radio communication apparatus as a communication partner with respect to the radio communication apparatus of the first embodiment of the present invention.

FIG. 2 is a block diagram illustrating the configuration of a radio communication apparatus as a communication partner with respect to the radio communication apparatus of FIG. 1.

A duplexer 202 switches a channel through which a signal passes at a transmitting time and a receiving time and outputs a signal received from an antenna 201 to a reception RF circuit 203, and outputs a transmitting signal outputted from a transmission RF circuit 208 to the antenna 201.

The reception RF circuit 203 amplifies the received signal, frequency-converts the amplified signal to a baseband, and outputs the resultant to a demodulating circuit 204. The demodulating circuit 204 demodulates the baseband signal and outputs the demodulated signal to an isolating circuit 205. The isolating circuit 205 isolates an output signal of the demodulating circuit 204 into received data and transmission power control information.

A CL (Closed Loop) transmission power control circuit 206 controls an increase or decrease in transmission power at the transmitting FR circuit 112 based on transmission power control information isolated at the isolating circuit 205.

A modulating circuit 207 modulates transmitting data and outputs it to the transmitting RF circuit 208. The transmitting RF circuit 208 converts the frequency of the output signal of the modulating circuit 207 and amplifies transmission power based on control of the CL transmission power control circuit 206, and transmits it as a radio signal from the antenna 201 through the duplexer 202.

Thus, desired signal power is averaged over the plurality of slots and the closed loop transmission power control is performed using the average value, making it possible to reduce a power error in desired signal power in the respective slots and to improve precision of measurement. This also makes it possible to control transmission power for each slot with high accuracy in the closed loop transmission power control of asymmetrical communication.

Second Embodiment

Figure 3:
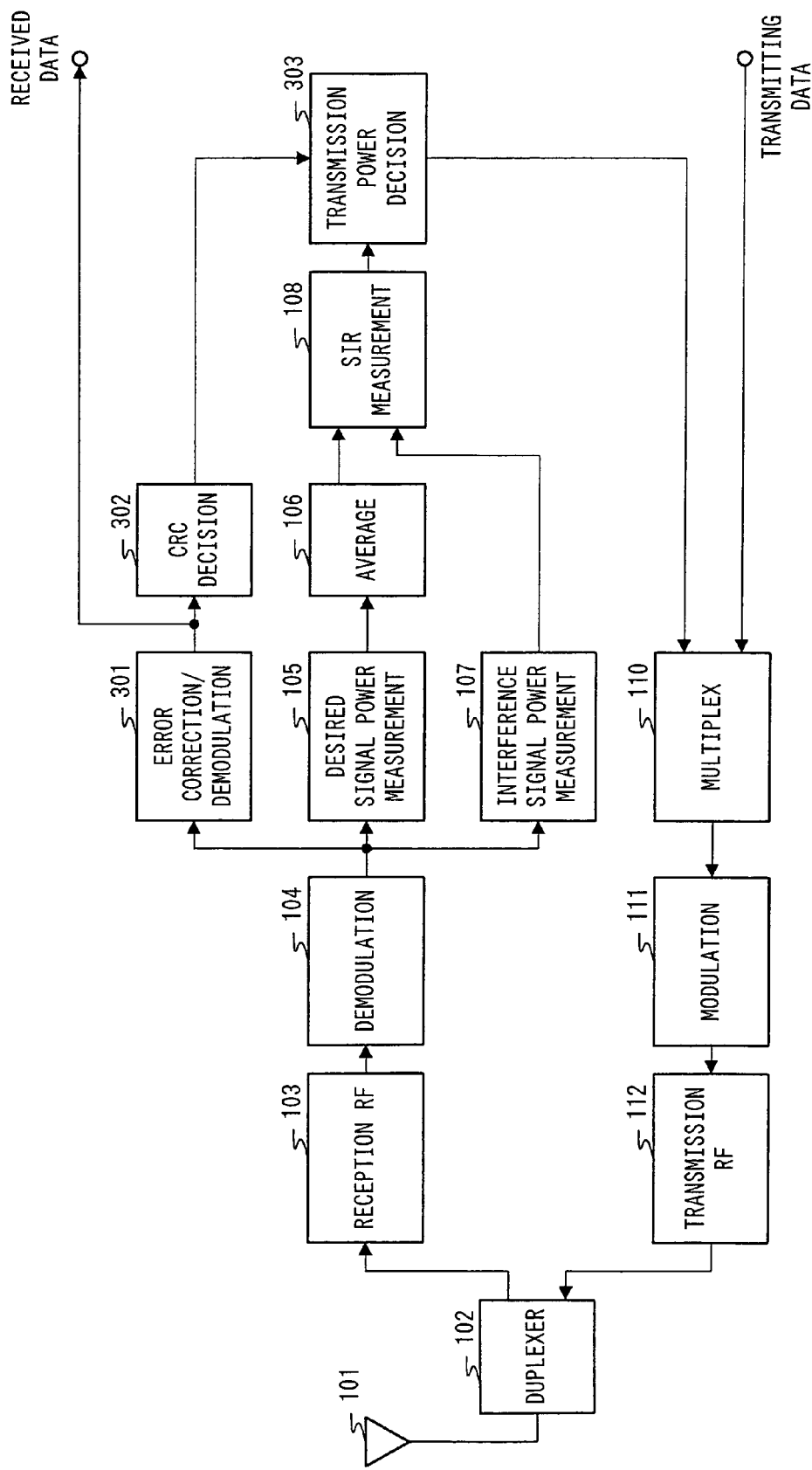
FIG. 3 is a block diagram illustrating the configuration of a radio communication apparatus according to a second embodiment of the present invention.

The second embodiment will explain the case of the open loop transmission power control having an outer loop that controls reference power for transmission power control. FIG. 3 is a block diagram illustrating the configuration of a radio communication apparatus according to the second embodiment of the present invention. In the radio communication apparatus illustrated in FIG. 3, the same reference numerals as those of FIG. 1 are added to the configuration portions having the same operations as those of the radio communication apparatus illustrated in FIG. 1, and the explanation is omitted.

The radio transmission apparatus illustrated in FIG. 3 adopts the configuration in which an error correcting/decoding circuit 301, a CRC deciding circuit 302, and a transmission power deciding circuit 303 are added to the radio communication apparatus illustrated in FIG. 1.

The error correcting/decoding circuit 301 provides error correcting/decoding processing to an output signal of the demodulating circuit 104, and extracts received data. The CRC deciding circuit 302 performs a CRC decision to the output signal of the demodulating circuit 104. The transmission power deciding circuit 303 calculates a transmission reference power value SIRt of a communication partner using a CRC decision value outputted from the transmission power deciding circuit 303 as a reference of reception quality.

Here, generally, in the case of performing transmission using a plurality of transmission slots, in order to scatter the positions of the error bits to improve an error correction capability, interleave is performed in such a way that transmitting signals of all slots are arranged at random. In this case, the radio communication apparatus transmits a signal indicative of transmission reference power value SIRt to the communication partner to make it possible to control transmission power of the communication partner such that the reception quality subjected to error correction processing in all slots satisfies a predetermined quality.

The radio communication apparatus, however, cannot excise control to the communication partner in response to interference amount of each slot using only transmission reference power value SIRt. This cannot reduce transmission power with respect to the slot whose interference amount is small, with the result that interference with other cells cannot be reduced.

In order to solve the above problem, the transmission power deciding circuit 303 of the radio communication apparatus adds SIR(n) of each slot to the calculated transmission reference power value SIRt to calculate a transmission reference power value SIRt(n) of each slot.

The multiplexing circuit 110 multiplexes information indicative of transmission reference power value SIRt(n) to transmitting data, and outputs the resultant to the modulating circuit 111.

Figure 4:
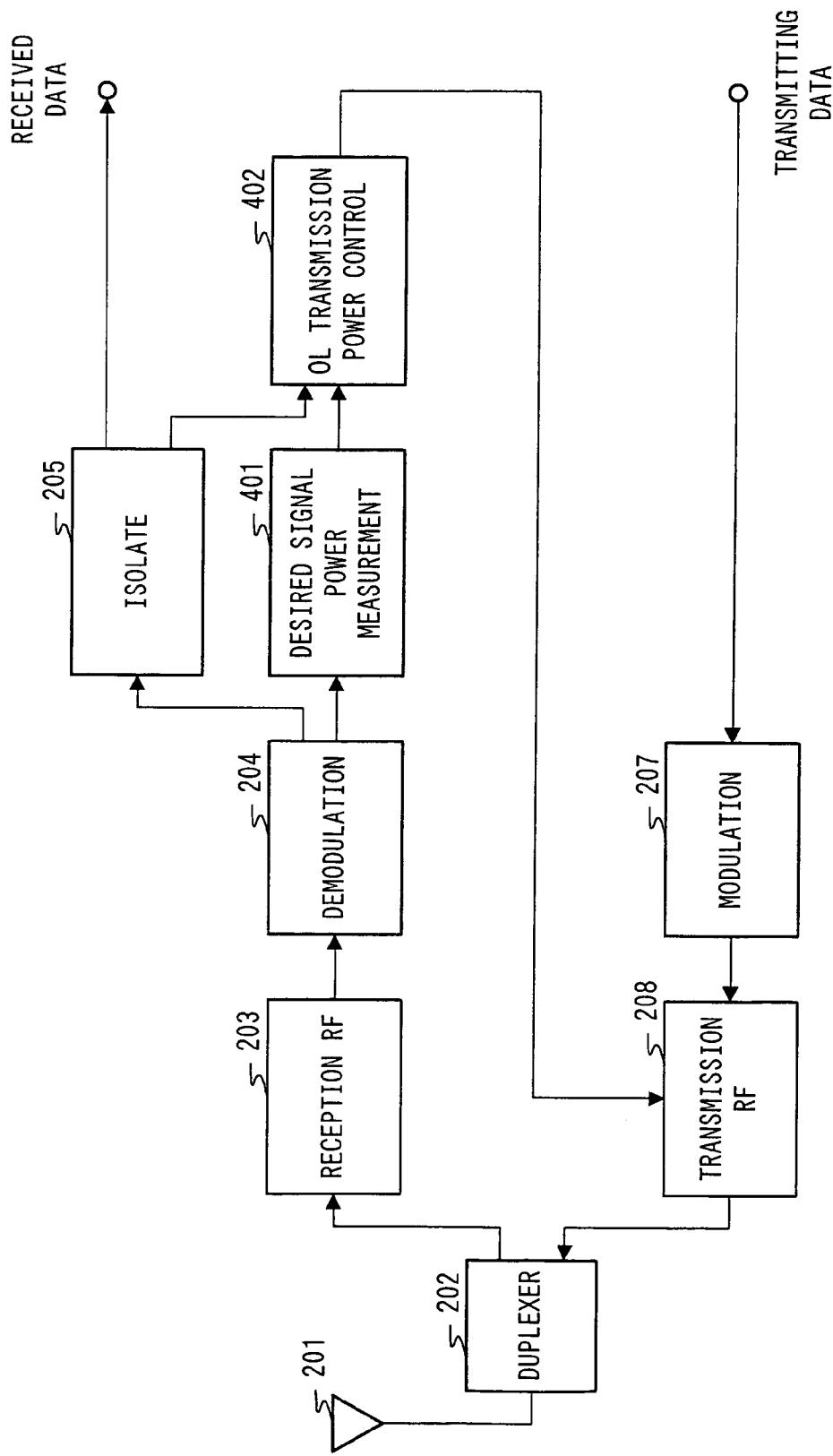
FIG. 4 is a block diagram illustrating the configuration of a radio communication apparatus as a communication partner with respect to the radio communication apparatus of the second embodiment of the present invention.

FIG. 4 is a block diagram illustrating the configuration of a radio communication apparatus as a communication partner with respect to the radio communication apparatus of FIG. 3. In the radio communication apparatus illustrated in FIG. 4, the same reference numerals as those of FIG. 2 are added to the configuration portions having the same operations as those of the radio communication apparatus illustrated in FIG. 2, and the explanation is omitted.

The radio transmission apparatus illustrated in FIG. 4 adopts the configuration in which a desired signal power measuring circuit 401 for the CL transmission power control circuit 206 and an OL (Open Loop) transmission power control circuit 402 are added as compared with the radio communication apparatus illustrated in FIG. 2.

The isolating circuit 205 isolates the output signal of the demodulating circuit 204 into received data and a transmission reference power control value SIRt(n).

The desired signal power measuring circuit 401 measures desired signal power S of the known signal included in the output signal of the demodulating circuit 204, and outputs the measuring result to the OL transmission power control circuit 402. The OL transmission power control circuit 402 calculates transmission power T(n) of each slot by equation (1) shown below and controls an increase or decrease in transmission power at the transmitting RF circuit 208. It is noted that Const in equation (1) is a fixed value for gain control.

$$T(n)=SIRt(n)-S+Const \quad (1)$$

Thus, the open loop transmission power control is performed with consideration given to SIR of each slot in addition to the transmission reference power value, making it possible to control transmission power for each slot with high accuracy in asymmetrical communication.

As explained above, according to the radio communication apparatus and the transmission power control method of the present invention, since the power error in desired signal power of each slot is reduced to make it possible to improve accuracy in measurement, transmission power can be controlled for each slot with high accuracy in asymmetrical communication.

This application is based on the Japanese Patent Application No. HEI 11-286317 filed on Oct. 7, 1999, entire content of which is expressly incorporated by reference herein.

INDUSTRIAL APPLICABILITY

The present invention is suitable for use in a base station apparatus of a radio transmission system or a communication terminal apparatus.

What is claimed is:

1. A radio communication apparatus that performs asymmetrical communication, the apparatus comprising:
    a desired signal power measurer that measures individual desired signal reception powers of a plurality of slots;
    an averager that calculates an average value of the individual desired signal reception powers of the plurality of slots;
    an interference signal power measurer that measures individual interference signal reception powers of the plurality of slots;
    an SIR measurer that measures individual reception qualities of the plurality of slots, in each slot a reception quality being measured based on the average value of the individual desired signal reception powers and one of the individual interference signal powers corresponding to said each slot;
    a power control information generator that generates individual transmission power control information corresponding respectively to the plurality of slots, based on the individual reception qualities of said plurality of slot; and
    a transmitter that transmits the individual transmission power control information corresponding respectively to the plurality of slots, in a single slot.

2. A radio communication apparatus that performs asymmetrical communication with the radio communication apparatus of claim 1, said radio communication apparatus comprising:
    an isolator that isolates, from a received signal, the individual transmission power control information corresponding respectively to the plurality of slots;
    a transmission power controller that controls individual transmission powers of the plurality of slots based on the individual transmission power control information corresponding respectively to said plurality of slots; and
    an amplifier that amplifies transmitting data in accordance with the control of the transmission power controller.

3. A radio communication apparatus that performs asymmetrical communication, the apparatus comprising:
    a desired signal power measurer that measures individual desired signal reception powers of a plurality of slots;
    an averager that calculates an average value of the individual desired signal reception powers of the plurality of slots;
    an interference signal power measurer that measures individual interference signal reception powers of the plurality of slots;
    an SIR measurer that measures individual reception qualities of the plurality of slots, in each slot a reception quality being measured based on the average value of the individual desired signal reception powers and one of the individual interference signal powers corresponding to said each slot;
    a reference power calculator that calculates individual reference transmission powers of the plurality of slots based on an overall reception quality of the plurality of slots and the individual reception qualities of said plurality of slots; and
    a transmitter that transmits individual reference transmission power control information corresponding respectively to the plurality of slots, in a single slot.

4. The radio communication apparatus according to claim 3, wherein the reference power calculator calculates a reference transmission power of a slot by adding the overall reception quality of the plurality of slots and one of the individual reception qualities of the plurality of slots corresponding to said slot.

5. The radio communication apparatus of claim 3, wherein the reference power calculator calculates the overall reception quality of the plurality of slots based on individual CRC check results of said plurality of slots.

6. A radio communication apparatus that performs asymmetrical communication with the radio communication apparatus of claim 3, said radio communication apparatus comprising:
    an isolator that isolates, from a received signal, the individual reference transmission power information corresponding respectively to the plurality of slots;
    a transmission power controller that controls individual transmission powers of the plurality of slots based on the individual reference transmission power information corresponding respectively to said plurality of slots; and
    an amplifier that amplifies transmitting data in accordance with the control of the transmission power controller.

7. A base station apparatus that performs asymmetrical communication, the apparatus comprising;
    a desired signal power measurer that measures individual desired signal reception powers of a plurality of slots;
    an averager that calculates an average value of said individual desired signal reception powers of the plurality of slots;
    an interference signal power measurer that measures individual interference signal reception powers of the plurality of slots;
    an SIR measurer that measures individual reception qualities of the plurality of slots, in each slot a reception quality being measured based on the average value of the individual desired signal reception powers and one of the individual interference signal powers corresponding to said each slot;

a power control information generator that generates individual transmission power control information corresponding respectively to the plurality of slots, based on the individual reception qualities of said plurality of slots; and a transmitter that transmits the individual transmission power control information corresponding respectively to the plurality of slots, in a single slot.

8. A communication terminal apparatus that performs asymmetrical communication, the apparatus comprising:

a desired signal power measurer that measures individual desired signal reception powers of a plurality of slots;

an averager that calculates an average value of said individual desired signal reception powers of the plurality of slots;

an interference signal power measurer that measures individual interference signal reception powers of the plurality of slots;

an SIR measurer that measures individual reception qualities of the plurality of slots, in each slot a reception quality being measured based on the average value of the individual desired signal reception powers and one of the individual interference signal powers corresponding to said each slot;

a reference power calculator that calculates individual reference transmission powers of the plurality of slots based on an overall reception quality of the plurality of slots and the individual reception qualities of said plurality of slots; and a transmitter that transmits individual reference transmission power control information corresponding respectively to the plurality of slots, in a single slot.

9. A transmission power control method in a plurality of radio communication apparatuses that perform asymmetrical communication, said method comprising:

in one of the plurality of communication apparatuses;

measuring individual desired signal reception powers of a plurality of slots;

calculating an average value of the individual desired signal reception powers of the plurality of slots;

measuring individual interference signal reception powers of the plurality of slots;

generating individual transmission power control information corresponding respectively to the plurality of slots, for each slot the individual transmission power control information being generated based on the average value of the individual desired signal reception powers and one of the individual interference signal powers corresponding to said each slot; and transmitting the individual transmission power control information corresponding respectively to the plurality of slots, in a single slot, and in another one of the plurality of radio communication apparatuses:

isolating, from a received signal, the individual transmission power control information corresponding respectively to the plurality of slots; and amplifying individual transmission powers of a plurality of transmitting slots based on the individual transmission power control information corresponding respectively to the plurality of slots.

10. A transmission power control method in a plurality of radio communication apparatuses that perform asymmetrical communication, said method comprising:

in one of the plurality of radio communication apparatuses:

measuring an overall reception quality of a plurality of slots;

measuring individual reception qualities of the plurality of slots;

calculating individual reference transmission powers of the plurality of slots based on the overall reception quality of the plurality of slots and the individual reception qualities of said plurality of slots; and transmitting individual reference transmission power information corresponding respectively to the plurality of slots, in a single slot, and in another one of the plurality of radio communication apparatuses:

isolating, from a received signal, the individual reference transmission power information corresponding respectively to the plurality of slots; and amplifying individual transmission powers of a plurality of transmitting slots based on the individual reference transmission power information corresponding respectively to the plurality of slots.

* * * * *